June 15, 1965 B. J. KERLEY, JR., ET AL 3,189,042
VACUUM RELIEF, PRESSURE RELIEF VALVE
Filed June 12, 1963 3 Sheets-Sheet 1
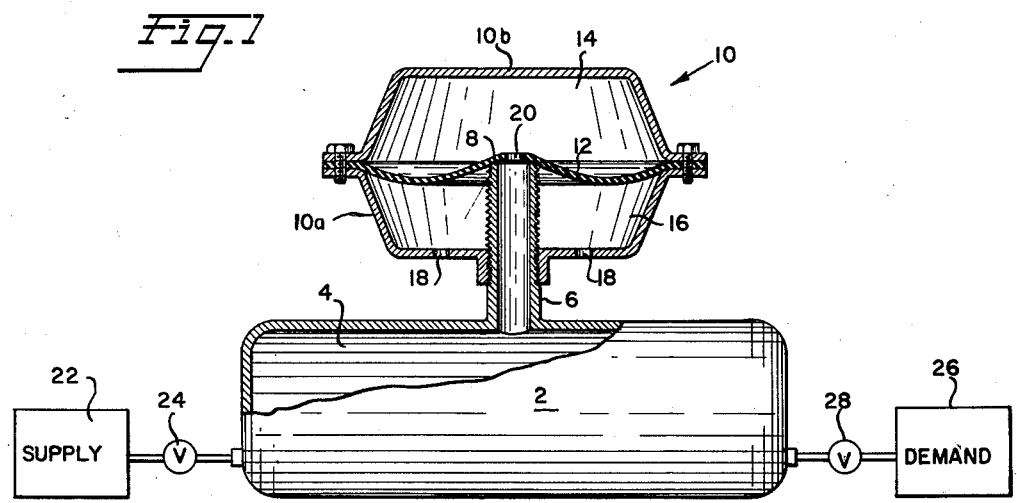
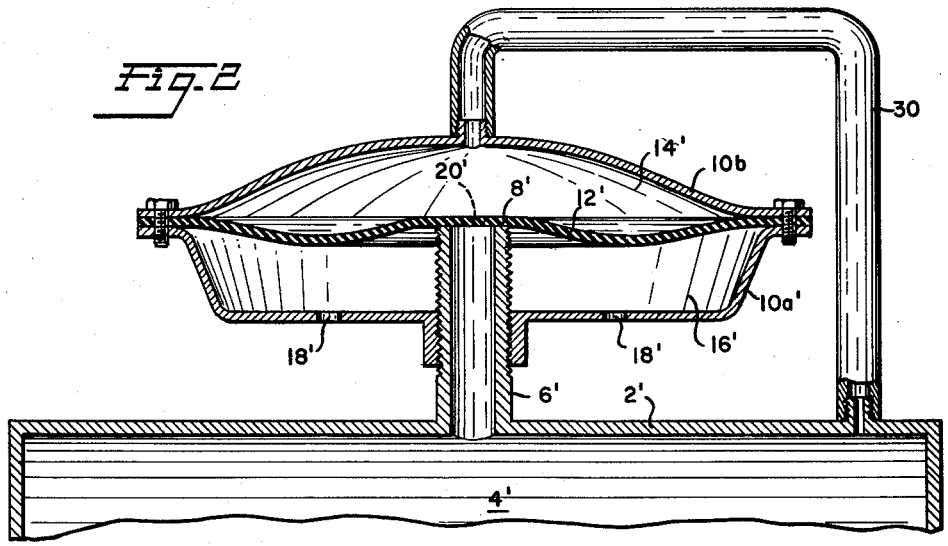
INVENTOR
BERNARD J. KERLEY, JR.
DONALD F. KERLEY
BY *Hugo E. Weisberger*
ATTORNEY

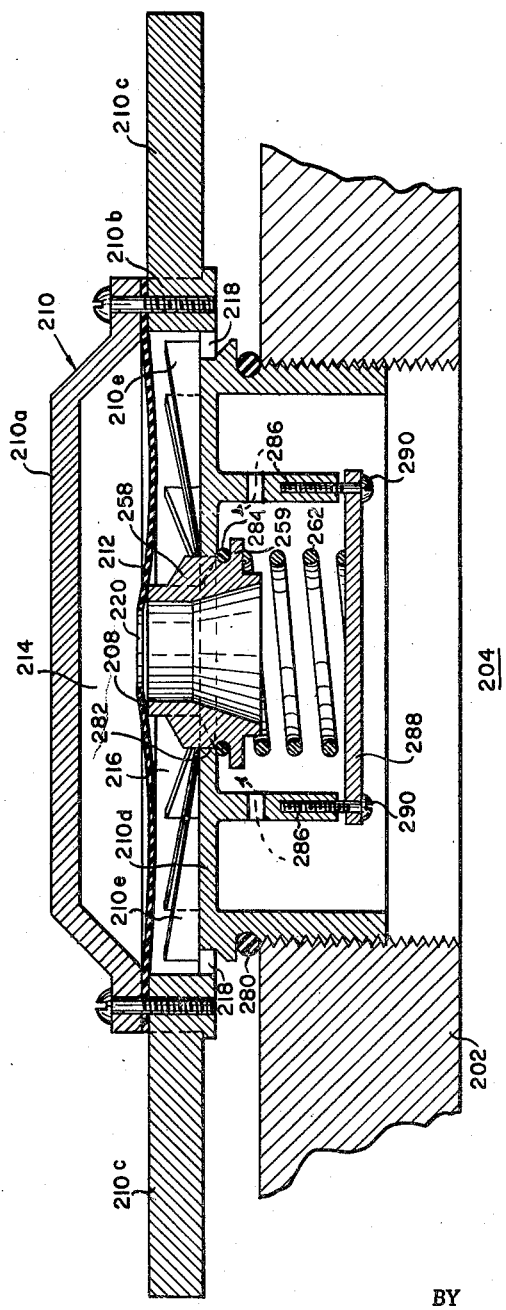

United States Patent Office 3,189,042
Patented June 15, 1965

3,189,042
VACUUM RELIEF, PRESSURE RELIEF VALVE
Bernard J. Kerley, Jr., 130 Crestview Drive, Orinda, Calif., and Donald F. Kerley, 2006 S. Jean St., Kennewick, Wash.
Filed June 12, 1963, Ser. No. 287,400
5 Claims. (Cl. 137—493.9)

This invention relates generally to vacuum relief valves, and more particularly to vacuum relief or breather valves of the diaphragm type which are automatically operable to prevent the creation of a vacuum in a container.

The use of vacuum relief and pressure relief valves is conventional in the art for venting containers to atmosphere under vacuum and excess pressure conditions, respectively. In many cases vacuum relief valves are used to prevent damage to pressure containers and attendant equipment which are not designed for vacuum conditions. Furthermore, vacuum relief or venting valves are provided for admitting air to a container during the withdrawal of residual gas and vapors by flushing. The known venting valves for containers possess several inherent drawbacks. For example, valves using metal components are susceptible to corrosion and sticking and thus are unreliable in operation. Manually operable venting valves are subject to faulty operation resulting from human error, and conventional automatically operable valves are normally complex and relatively expensive. Leakage of fluid through the vacuum relief valves under pressure conditions presents a serious problem, particularly in the chemical industry where the lost fluids consist of expensive products or possess repugnant odors. The present invention was developed to provide an improved vacuum relief valve which avoids the above and other drawbacks of the known devices.

Accordingly, a primary object of the present invention is to provide an improved vacuum relief valve which automatically vents a container to atmosphere when the container pressure falls below atmospheric pressure.

Another object of the invention is to provide a vacuum relief valve including flexible diaphragm means which are automatically biased toward a closed position when the fluid pressure in a container exceeds atmospheric pressure and are automatically opened when a container pressure is less than atmospheric pressure.

A more specific object of the invention is to provide a vacuum relief valve having means including a valve seat for venting a container to atmosphere (or to any other desired reservoir system), a diaphragm arranged for engagement with said valve seat, and a diaphragm housing containing a chamber in continuous communication with said container for biasing said diaphragm toward seating engagement with said seat when the container pressure exceeds atmospheric pressure. According to one embodiment of the invention, the means permitting continuous communication between the container and the diaphragm housing chamber comprises a passage or opening in the diaphragm, said opening being opposite the valve seat and having smaller dimensions than the corresponding seat dimensions. In accordance with another embodiment of the invention, an auxiliary by-pass conduit is provided for affording continuous communication between the container and the housing chamber.

A further object of the invention is to provide a pressure-relief, vacuum-relief valve which is operable to vent a container either when the fluid pressure therein exceeds a predetermined value or when the container pressure is less than atmospheric pressure.

Still another object of the invention is to provide vacuum relief valve means the valve member of which comprises a non-metallic flexible diaphragm, whereby the possibility of corrosion and sticking of cooperating valve elements is avoided.

Other objects and advantages of the invention will become apparent from a study of the following specification when considered in the light of the accompanying drawing, in which:

FIG. 1 is a partially sectioned diagrammatic illustration of the vacuum relief valve of the present invention;

FIG. 2 is a detailed sectional view of another embodiment of the vacuum relief valve;

FIG. 4 illustrates the preferred pressure-relief, vacuum relief embodiment of the invention.

Figure 3:
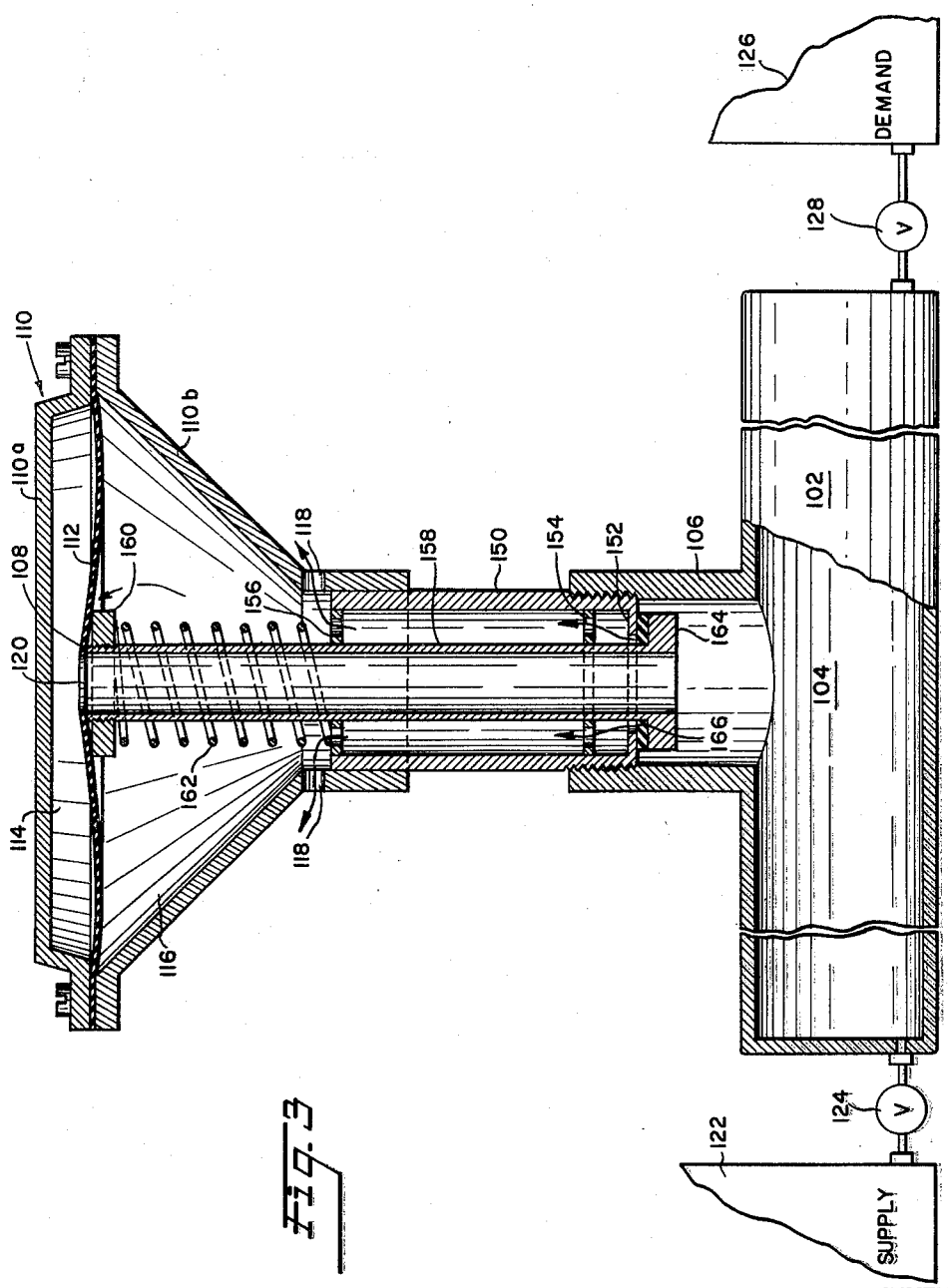
FIG. 3 is a partially sectioned diagrammatic illustration of a pressure-relief, vacuum-relief valve embodiment of the invention.

Referring first to FIG. 1, the container or tank 2 is provided with an interior chamber 4 in communication with a venting neck 6 which terminates at its free end in a valve seat 8. Rigidly mounted upon neck 6 is a housing 10 containing a flexible diaphragm 12 which defines first and second housing chambers 14 and 16, respectively. Chamber 16 communicates with atmosphere via openings 18 in the lower housing section 10a. Diaphragm 12 contains a through passage or opening 20 opposite valve seat 8, the transverse dimensions of this passage being smaller than the corresponding dimensions of the valve seat opening. Passage 20 affords continuous communication between tank chamber 4 and housing chamber 14.

The tank 2 is supplied with a gaseous pressure fluid from supply 22 via valve 24. The pressure fluid is supplied from the tank to demand 26 via valve 28. It is apparent, of course, that a single valve might be utilized for supplying pressure fluid to, and for withdrawing pressure fluid from, the tank.

The valve seat 8 and the diaphragm 12 are so arranged that when the pressure of chamber 14 equals or exceeds atmospheric pressure, the flexible diaphragm is seated on valve seat 8 to prevent communication between tank chamber 4 and the second housing chamber 16. Although the weight of the diaphragm is normally sufficient to maintain this seating engagement, if desired the diaphragm may be biased downwardly by the provision of light compression spring means (not shown) in chamber 14 which react between upper housing section 10b and the diaphragm. Furthermore, the non-stressed configuration of the diaphragm may be such as to obtain the aforementioned seating engagement when chamber 14 is at atmospheric pressure.

Assume now that valves 24 and 28 are open and closed, respectively. As pressure fluid is supplied to the tank via valve 24, the pressure of tank chamber 4 increases. Since upper housing chamber 14 is in communication with chamber 4 via venting neck 6 and diaphragm passage 20, the pressure in chamber 14 also increases and biases diaphragm 12 downwardly, thereby increasing the seating pressure of diaphragm 12 upon valve seat 8. Upon closing of valve 24, the pressure in chambers 4 and 14 remains constant, leakage being prevented by the relatively large seating force applied to diaphragm 12 by the pressure fluid in chamber 14. If valve 28 should now be opened, fluid is supplied from chambers 4 and 14 to the demand 26 and the pressure of these chambers decreases. As long as the fluid pressure in chamber 14 exceeds atmospheric pressure, diaphragm 12 is seated on valve seat 8 to prevent communication between chambers 4 and 16. Assume now that for some reason the demand should cause the pressure in chambers 4 and 14 to fall below atmospheric pressure. Under this condition, the atmospheric pressure in housing chamber 16 is greater than that in chambers 4 and 14, and consequently diaphragm 12 is raised from valve seat 8. Air at atmospheric pressure is now supplied to tank chamber 4 via openings 18, chamber 16, valve seat 8, and neck 6. When tank pressure reaches atmospheric pressure, diaphragm 12 moves downwardly in seating engagement with valve seat 8 as described above. Valve 28 is closed whereupon the charging and discharging of the tank may be repeated as described above.

Because the relief valve opens automatically for all vacuum conditions in the tank, it is apparent that the removal of residual vapors by flushing is quite simple. Since the development of a vacuum in the tank is avoided in a positive, reliable manner, the danger of damage to associated equipment and harm to attendant personnel are avoided. Moreover, since the flexible diaphragm is preferably formed from rubber or a suitable synthetic plastic material (for example, neoprene), the possibility of sticking of the valve elements and corrosion of metal parts is circumvented.

Referring now to the modification of FIG. 2, the upper housing chamber 14' is in continuous communication with tank chamber 4' via a by-pass conduit 30 the opposite ends of which are connected with upper housing section 10b' and container 2', respectively. In this embodiment, the provision of a passage opening in the diaphragm 12' opposite valve seat 8' is optional, depending on the pressure conditions that are to be experienced in the tank. If an opening is to be provided in the diaphragm (as shown in phantom and indicated by reference numeral 20'), its transverse dimensions must be smaller than the corresponding dimensions of valve seat 8'. The operation of the FIG. 2 embodiment is identical to that described above with reference to FIG. 1.

In accordance with the invention, it is possible to provide improved valve means which are operable to vent the tank to atmosphere for either vacuum or excess pressure conditions. Referring to the embodiment of FIG. 3, the diaphragm housing 110 is secured at its lower end to a hollow neck extension 150 which is screwed in a threaded bore in venting neck 106. Flexible diaphragm 112 defines upper and lower chambers 114 and 116, respectively, in housing 110. Longitudinally spaced perforated guide plates 152, 154 and 156 are secured within extension 150 and include aligned central bores which slidably receive the tubular valve stem 158. The upper end of valve stem 158 extends within housing chamber 116 and terminates in a valve seat 108 adjacent diaphragm 112. Diaphragm 112 contains an opening 120 opposite valve seat 108, this opening having smaller dimensions than the corresponding dimensions of the valve seat. Threadably mounted upon the upper end of stem 158 is an adjusting nut 160. This nut serves to adjust the pressure of compression spring 162 mounted concentrically about stem 158 between plate 156 and nut 160.

The lower end of hollow valve stem 158 extends below the lowermost guide plate 152 and is provided with an annular projection 164 which supports annular valve disk 166. In the illustrated position, spring 162 biases valve stem 158 upwardly to seat valve disk 166 upon the perforations in lower guide plate 152.

It is apparent that tank chamber 104 is in continuous communication with upper housing chamber 114 via the bore of valve stem 158 and the passage 120 in diaphragm 112. When the fluid pressure in chamber 114 exceeds the opposing force of spring 162, valve stem 158 moves downwardly to lower disk 166 from guide plate 152, whereupon chamber 104 communicates with atmosphere via the perforations in guide plates 152, 154 and 156, chamber 116 and housing openings 118.

The operation of the FIG. 3 embodiment is apparent. Assume that nut 160 has been adjusted to establish the desired maximum pressure value which is to be permitted in tank chamber 104, and that the initial pressure in chambers 104 and 114 is atmospheric pressure. Since chambers 116 and 114 are at equal pressure, diaphragm 112 is seated upon valve seat 108 to prevent communication between chambers 116 and 104 via hollow valve stem 158. Valve stem 158 is biased upwardly by spring 162 to seat valve disk 166 upon plate 152 and thereby prevent communication between chambers 104 and 116 via the perforations in the guide plates.

Assuming that valves 124 and 128 are open and closed, respectively, the pressure of the gaseous fluid in chambers 104 and 114 progressively increases until the predetermined pressure setting of spring 162 is exceeded, whereupon valve stem 158 is moved downwardly by diaphragm 112. Fluid is now vented from tank 102 via the perforations in plates 152, 154 and 156, chamber 116 and openings 118. When tank pressure decreases to the pressure setting of spring 162, the spring moves stem 158 upwardly to seat disk 166 upon the perforations in plate 152. During the above operation of the valve stem, the pressure in chamber 114 is greater than atmospheric pressure, and consequently diaphragm 112 is maintained seated upon valve seat 108 to prevent communication between chambers 116 and 104.

If the pressure in chambers 104 and 114 should drop below atmospheric pressure, the pressure differential between chambers 116 and 114 causes diaphragm 112 to be lifted from seat 108, whereupon atmospheric air is supplied to chamber 104 via openings 118, chamber 116, and valve stem 158. When tank pressure rises to atmospheric pressure, diaphragm 112 is again seated upon valve seat 108. During this vacuum condition in tank 102, valve stem 158 is maintained in the illustrated position by spring 162 to close disk 166 upon perforated guide plate 152.

A simpler and less expensive pressure-relief vacuum-relief valve embodiment is illustrated in FIG. 4. The valve housing 210 includes upper and lower sections 210a and 210b between which is mounted a flexible diaphragm 212 defining upper and lower chambers 214 and 216, respectively. Housing section 210b includes lateral handle extensions 210c and a tubular externally threaded lower portion which is screwed within a threaded vent opening in container 202. During installation, housing 210 is rotated by its handles 210c to tighten the connection between the housing and the container and thereby compress O-ring seal 280. Housing section 210b includes a transverse wall 210d containing a valve seat opening 282. Extending upwardly from transverse wall 210d are a plurality of radially arranged ribs 210e the upper surfaces of which taper inwardly toward the opening 282.

Vertically slidable in opening 282 is a hollow valve stem 258 the upper end of which terminates in an annular valve seat surface 208. The transverse dimensions of the bore in valve stem 258 are greater than the corresponding dimensions of the opening 220 contained in flexible diaphragm 212. Consequently, continuous communication between chambers 214 and 204 is afforded via opening 220. Hollow valve stem 258 is provided, below transverse wall 210d, with an annular flange 259 which supports O-ring 284. Extending downwardly from transverse wall 210d are a plurality of rigid supports 286 which are circumferentially arranged about opening 282. A spring retainer plate 288 is connected with the lower ends of supports 286 by adjusting screws 290. Compression spring 262, mounted between annular flange 259 and retainer plate 288, biases valve stem 258 upwardly toward the illustrated closed position, whereby O-ring 284 is compressed between flange 259 and wall 210d to prevent communication between container chamber 204 and housing chamber 216 via opening 282. Housing section 210b contains openings 218 affording communication between chamber 216 and atmosphere.

The operation of the FIG. 4 embodiment is as follows: Assuming that the pressure in chamber 204 equals atmospheric pressure, valve stem 258 is maintained in the illustrated closed position by spring 262, and since chambers 214 and 216 are at equal pressure, diaphragm 212 is seated upon valve seat 208 to prevent communication between chambers 204 and 216 via the bore of valve stem 258.

If the pressure in chambers 204 and 214 should exceed the pressure setting of spring 262 (as determined by the positions of screws 290), the difference in pressure between chambers 214 and 216 causes diaphragm 212 to flex downwardly and thereby lower valve stem 258 against the biasing force of spring 262. Lowering of valve stem 258 and the O-ring 284 carried thereby effects opening of the passage through valve seat 282, whereby the pressure fluid in chamber 204 is vented to atmosphere via opening 282, chamber 216 and housing openings 218. When the pressure in chamber 204 decreases to the pressure setting of spring 262, valve stem 258 is moved upwardly toward the illustrated position to close valve seat opening 282.

If the pressure in chambers 204 and 214 should decrease below atmospheric pressure, the pressure differential between chambers 216 and 214 causes diaphragm 212 to be lifted from seat 208, whereby atmospheric air flows to chamber 204 via openings 218, chamber 216, and the bore of hollow stem 258. During this flow of air, valve stem 258 is maintained in the illustrated closed position by spring 262. When the pressure in chambers 204 and 214 rises to atmospheric pressure, diaphragm 212 is again seated on valve seat 208 to interrupt communication between chambers 216 and 204 via the valve stem bore.

In the foregoing specification, the container has been described as being vented to "atmosphere." However, in certain systems (for example, those using gases which are subject to the hazard of explosion when mixed with air) it is apparent that the container may be vented into a reservoir or other pressure circuit containing a neutral gaseous medium, or a reservoir for purposes of conserving vented valuable or noxious fluids.

While in accordance with the provisions of the patent statutes the best forms and embodiments of the invention have been illustrated and described, it will be apparent to those skilled in the art that changes may be made without deviating from the invention set forth in the following claims.

What is claimed is:

1. A pressure-relief vacuum-relief valve adapted for use with a container having a vent opening, comprising
   a hollow housing including a tubular extension adapted for connection with said vent opening to afford communication between said container and said housing;
   a diaphragm mounted in said housing and defining first and second chambers therein, said second chamber being in communication with said container through said tubular extension;
   transverse wall means secured to said tubular extension intermediate said second chamber and said container, said transverse wall means containing a first valve seat opening;
   a hollow valve member mounted for axial sliding movement in said valve seat opening to open and close the passage therethrough, said hollow valve member extending at one end in said second housing chamber and carrying at its free end a second valve seat adjacent said diaphragm, said housing containing openings affording continuous communication between said second chamber and the region external of said housing;
   spring means biasing said valve member in one direction toward a position closing said first valve opening, said diaphragm being arranged for seating engagement with said second valve seat when said valve member is in said closed position, thereby preventing communication between said second chamber and the container through the bore of said valve member;
   and means affording continuous communication between said container and said first housing chamber, whereby when the pressure of the external region exceeds that of the container, the diaphragm is raised in one direction from said second valve seat, and when the container pressure exceeds that of the external region, the diaphragm is displaced in the opposite direction to open the hollow valve member from its valve seat.

2. Pressure responsive valve means for venting a container having a vent opening, comprising
   a diaphragm housing adapted for connection with said container in communication with said vent opening;
   a diaphragm mounted in said housing and defining first and second chambers therein remote from and adjacent said vent opening, respectively, said housing including means continuously affording communication between said second chamber and the region external of said housing and said container;
   passage means affording continuous communication between said first chamber and said vent opening;
   normally-closed vacuum relief valve means for affording communication between said second chamber and said vent opening when the pressure in the second chamber exceeds that of the first chamber by a predetermined value, said valve means including movable vacuum relief valve seat means normally in closed seating engagement with said diaphragm, said vacuum relief valve seat means being opened upon relative movement of said diaphragm in one direction; and
   normally-closed pressure relief valve means associated with said movable vacuum relief valve seat means and operable by movement of said diaphragm in the opposite direction for affording communication between said second chamber and said vent opening when the pressure in the first chamber exceeds that of the second chamber by a predetermined value.

3. Pressure-responsive valve means for venting a container having a vent opening, comprising
   a diaphragm housing adapted for connection with said container and including an opening in communication with said vent opening;
   a diaphragm mounted in said housing and defining first and second chambers therein remote from and adjacent said vent opening, respectively, said housing including means continuously affording communication between said second chamber and the region external of said housing and said container;
   passage means affording continuous communication between said first chamber and said vent opening;
   a rigid body mounted for movement in said housing opening, said body carrying at one end in said second chamber a vacuum relief valve seat and including a valve seat passage in communication at opposite ends with said second chamber and said vent opening, respectively;
   spring means biasing said body toward a given position in which said vacuum relief valve seat is in normally closed seating engagement with said diaphragm, said diaphragm being opened in one direction from said vacuum relief valve seat when the pressure in the second chamber exceeds that of the first chamber by a predetermined amount; and
   normally-closed pressure relief valve means operable by movement of said diaphragm in the opposite direction for affording communication between said second chamber and said vent opening when the pressure in the first chamber exceeds that of the second chamber by a predetermined amount, said pressure relief valve means including a valve member carried by said rigid body, and a stationary pressure relief valve seat carried by said housing intermediate said valve member and said diaphragm, said pressure relief valve seat being arranged for seating engagement with said valve member when said body is in said given position.

4. Pressure-responsive valve means adapted for use with a container having a vent opening, comprising
- a diaphragm housing including hollow neck means adapted to connect said housing with the container vent opening;
- a diaphragm mounted in said housing and defining first and second chambers therein remote from and adjacent said neck means, respectively, said housing containing openings affording continuous communication between said second chamber and the region external of said housing and container;
- a hollow valve stem mounted for longitudinal sliding movement in the bore of said neck means, one end of said stem terminating in a first valve seat in said second chamber;
- a valve member carried by the other end of said valve stem;
- said neck means including a stationary second valve seat intermediate said valve member and said diaphragm for affording communication between said second chamber and said container through a portion of the vent neck bore external of the valve stem;
- spring means biasing said valve stem in one direction to seat valve member on said second valve seat, said diaphragm being arranged to engage the first valve seat to interrupt communication between the second chamber and the valve stem bore when said valve member is seated on said second valve seat; and
- means affording continuous communication between said first housing chamber and the bore of said valve stem whereby when the pressure of the external region exceeds container pressure by a predetermined amount, the diaphragm is lifted in one direction from said first valve seat, and when the container pressure exceeds external region pressure by a predetermined amount, the diaphragm flexes in the opposite direction to open said valve member from the second valve seat.

5. A pressure-relief vacuum-relief valve adapted for use with a container having a vent opening, comprising
- a hollow housing including a tubular extension adapted for connection with said vent opening to afford communication between said container and said housing;
- a diaphragm mounted in said housing and defining first and second chambers therein, said second chamber being in direct communication with said container through said tubular extension, said diaphragm containing also an opening affording communication between said first and second chambers, said housing containing openings affording continuous communication between said second chamber and the region external of said housing;
- transverse wall means secured within said tubular extension and containing a first valve seat opening affording communication between said container and said second chamber;
- hollow valve means containing an axial bore and mounted for axial sliding movement in said first valve seat opening for opening and closing the passage therethrough, said hollow valve means being movable from a first position closing said first valve seat opening in one direction away from said diaphragm toward a second position opening the passage through said first valve seat opening, said hollow valve means extending at one end in said second housing chamber and defining at its free end a second valve seat opposite the opening in said diaphragm, said second valve seat containing an opening the dimensions of which are greater than the corresponding dimensions of the diaphragm opening;
- and spring means biasing said valve member in the opposite direction toward said first position, said diaphragm being arranged for normal seating engagement with said second valve seat when said valve member is in said first position to prevent communication between said second chamber and the container through the bore of said hollow valve means and to effect communication between said first chamber and said container through the diaphragm opening and the hollow valve means, whereby when the pressure of the external region exceeds that of the container, the diaphragm is raised in one direction from said second valve seat, and when the container pressure exceeds that of the external region, the diaphragm is displaced in the opposite direction to open the hollow valve member from the first valve seat.

References Cited by the Examiner

UNITED STATES PATENTS

| | | | |
|---|---|---|---|
| 347,516 | 8/86 | Sargent | 137—510 |
| 1,651,971 | 12/27 | Shield | 137—509 |
| 2,394,911 | 2/46 | Griswold | 137—491 XR |
| 2,511,435 | 6/50 | Griswold | 137—510 |
| 2,971,531 | 2/61 | Jurs et al. | 137—493.9 |
| 3,075,544 | 1/63 | Heideman | 137—489 XR |

M. CARY NELSON, *Primary Examiner.*

MARTIN P. SCHWADRON, *Examiner.*